(12) United States Patent
Duchardt et al.

(10) Patent No.: US 12,371,887 B2
(45) Date of Patent: Jul. 29, 2025

(54) METHOD FOR CONVEYING A LIQUID INTO A CONTAINER

(71) Applicant: BRITA GMBH, Taunusstein (DE)

(72) Inventors: Thomas Duchardt, Offenbach (DE);
Oliver Machui, Bad Homburg (DE)

(73) Assignee: BRITA SE, Taunusstein (DE)

( * ) Notice: Subject to any disclaimer, the term of this patent is extended or adjusted under 35 U.S.C. 154(b) by 160 days.

(21) Appl. No.: 18/263,458

(22) PCT Filed: Jan. 28, 2022

(86) PCT No.: PCT/EP2022/052012
§ 371 (c)(1),
(2) Date: Jul. 28, 2023

(87) PCT Pub. No.: WO2022/162128
PCT Pub. Date: Aug. 4, 2022

(65) Prior Publication Data
US 2024/0084563 A1    Mar. 14, 2024

(30) Foreign Application Priority Data
Feb. 1, 2021    (EP) .................................. 21154510

(51) Int. Cl.
*E03C 1/04*    (2006.01)
*E03C 1/044*    (2006.01)

(52) U.S. Cl.
CPC ............ *E03C 1/0411* (2013.01); *E03C 1/044* (2013.01)

(58) Field of Classification Search
CPC .......... E03C 1/0411; E03C 1/044; G01F 9/00; E03B 7/071; E03B 7/075; A47J 31/52

USPC ...................................................... 4/675–678
See application file for complete search history.

(56) References Cited

U.S. PATENT DOCUMENTS

| | | | | |
|---|---|---|---|---|
| 2,354,272 | A * | 7/1944 | Miller | F25D 23/126 137/259 |
| 9,211,569 | B1* | 12/2015 | Bowser | E03D 9/002 |
| 9,993,106 | B2 | 6/2018 | Majer | |
| 2015/0132458 | A1* | 5/2015 | Lee | A47J 31/465 426/433 |
| 2022/0039610 | A1* | 2/2022 | Nowotarski | B05B 7/2464 |
| 2022/0183502 | A1* | 6/2022 | Zhao | A47J 31/56 |
| 2022/0411251 | A1* | 12/2022 | Castonguay | B67D 1/12 |

FOREIGN PATENT DOCUMENTS

| | | |
|---|---|---|
| CN | 110291258 A | 9/2019 |
| WO | 2018/149624 A1 | 8/2018 |

* cited by examiner

*Primary Examiner* — Lori L Baker
(74) *Attorney, Agent, or Firm* — Colson Law Group, PLLC

(57) ABSTRACT

A method for conveying a liquid into a container of a conveying device. The conveying device comprising a liquid reservoir, a pump and a tap. The liquid is supplied by the pump from the liquid reservoir via a tap inlet to the tap. The liquid emerges from a tap outlet of the tap and flows into the container arranged below the tap outlet. An outlet volume flow rate of the liquid flowing from the tap outlet is controlled in such a way that at first the liquid is conveyed with an initial volume flow rate until an initial delivery volume has been conveyed and then the liquid is conveyed with a final volume flow rate, the final volume flow rate being greater than the initial volume flow rate

10 Claims, 1 Drawing Sheet

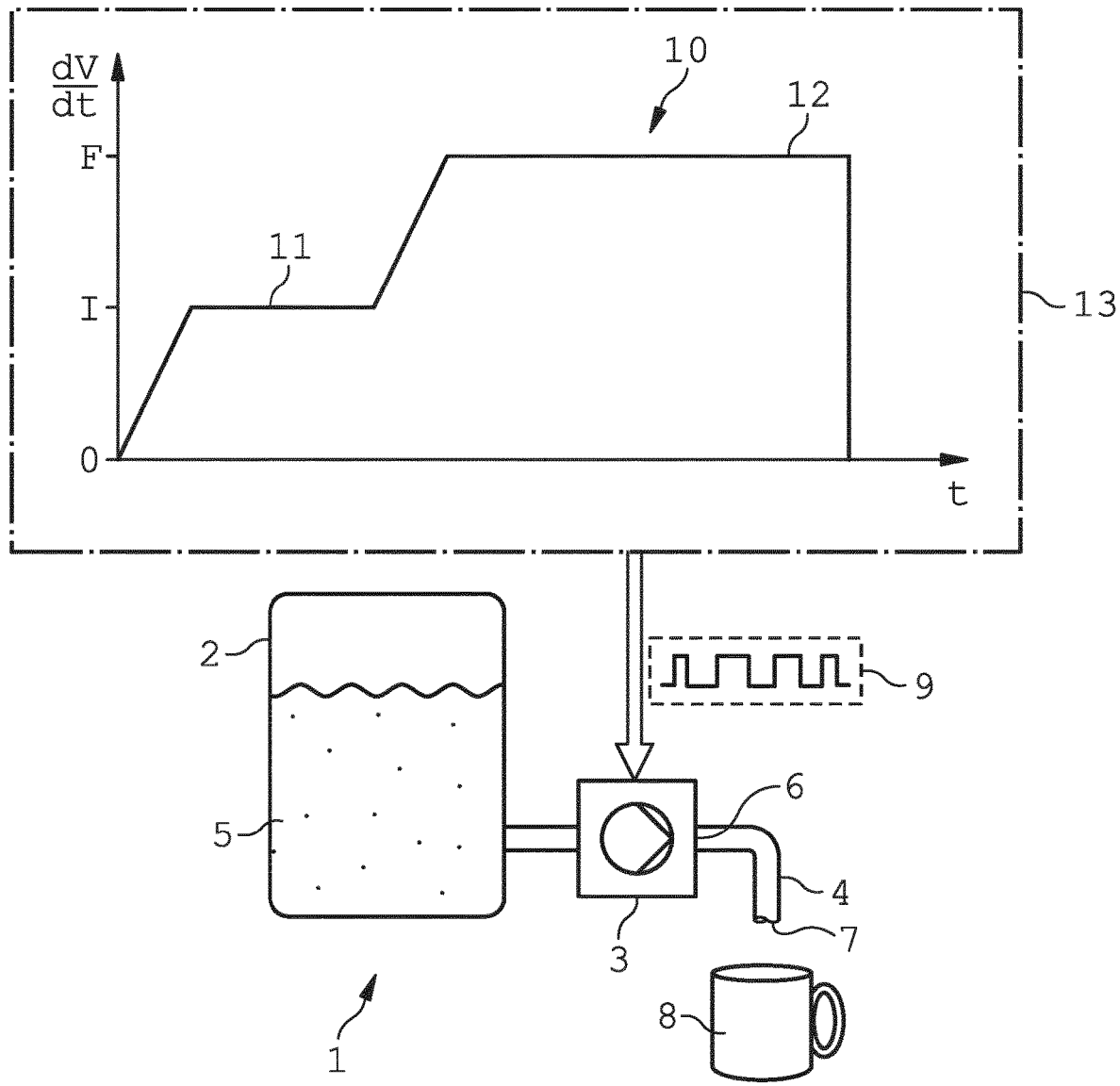

METHOD FOR CONVEYING A LIQUID INTO A CONTAINER

TECHNICAL FIELD

The invention relates to a method for conveying a liquid into a container by means of a conveying device, the conveying device comprising a liquid reservoir, a pump and a tap, wherein the liquid is supplied by the pump from the liquid reservoir via a tap inlet to the tap, and wherein the liquid emerges from a tap outlet of the tap and flows into the container arranged below the tap outlet.

BACKGROUND OF THE INVENTION

Faucets with a function for providing hot or boiling water are well-known. Usually such faucets are equipped with a boiler to provide the hot water. The hot water is pumped from the boiler or a similar liquid reservoir to the tap, from which the water is then discharged into a container, for example into a portable container like a pot, a cup or a glass. The pump is usually either operated at full power conveying the maximum possible volume flow rate through the pump or not operated at all. To prevent hot water drops from splashing out of the tap and/or the cup when the hot water comes out of the tap or hits the bottom of the cup and thus, for example, burns the operator of the faucet, strainer or aerator controls are usually placed at the tap outlet.

However, when using systems with increased hygiene requirements, it may be necessary to use the faucet without a strainer control. Hot drops can thus be carried over the edge of the cup and cause burns to the user.

U.S. Pat. No. 9,993,106 B2 discloses a device and method for preparation of beverages with differing tastes. WO 2018/149624 A1 discloses a device for dispensing hot water.

Accordingly, there is a need for providing a method for conveying a liquid into a container which prevents liquid drops from splashing out of the tap and/or the container. Preferably, the filling time should not be excessively prolonged.

SUMMARY OF THE INVENTION

The present invention relates to a method for conveying a liquid into a container as described at the beginning, characterized in that an outlet volume flow rate of the liquid flowing from the tap outlet is controlled in such a way that at first the liquid is conveyed with an initial volume flow rate until an initial delivery volume has been conveyed and then the liquid is conveyed with a final volume flow rate, the final volume flow rate being greater than the initial volume flow rate. Thus, at the beginning of a conveying operation, e.g. of conveying hot water, the liquid stream discharged from the tap outlet leaves the tap outlet at a low speed compared to the speed of the liquid stream discharged with the conveying device when providing the final volume flow rate. The slower liquid stream has a lower tendency to splash when it hits the container surface. After filling the container with the initial volume, the outlet volume flow rate is increased until the final volume flow rate is reached. The final volume flow rate corresponds to a regular flow rate expected, e.g. expected from the operator of a faucet. The increased stream velocity resulting from the higher outlet volume flow rate does not lead to spraying anymore, because the container is now already partially filled and the liquid in the container slows down the liquid stream. The initial volume flow rate and the final volume flow rate are preferably constant over time.

However, the initial volume flow rate and thus the initial outlet flow velocity must not be too low, because otherwise the outlet stream may consist of several water jets separated from each other, which may also cause splashing. Thus, according to an advantageous embodiment of the invention, the initial volume flow rate is given such that a connected and regular liquid stream is provided.

The pump used for the delivery can advantageously be a centrifugal pump, a membrane pump or a rotary piston pump, such as a gear pump or a lobe pump. However, different pump types are well-known and may be chosen according to the specific purpose of use of the conveying device.

According to an advantageous embodiment of the invention, the outlet volume flow is stopped after reaching a final volume. Usually, it is not necessary to further adjust the outlet volume flow rate after the final volume flow rate has reached. Thus, in order to fill up the container as fast as possible without splashing hot water drops the final volume flow rate is held up until the container is filled with the desired liquid volume. The final volume may be given in advance or may be adjustable by the operator according to the volume of the used container.

It is regarded as an essential aspect of the present invention that the outlet volume flow rate is adjusted by changing a flow rate of the pump. The flow rate of the pump can be adjusted for example by providing a controllable metering valve between the liquid reservoir and the pump at the pump inlet in order to control the liquid volume flow rate flowing from the liquid reservoir into the pump.

In accordance with a particularly advantageous embodiment of the invention, the flow rate of the pump is adjusted by changing a pump speed of the pump. Particularly, if a rotary piston pump is used, the flow rate of the pump can be adjusted by changing the rotational speed of the pump.

The pump is advantageously driven by an electric motor. By using an electric motor the pump speed can easily be adjusted by controlling the current supplied to the electric motor.

It is regarded as an essential aspect of the present invention that the pump is driven by a direct current motor and the pump speed is changed by driving the electric motor with a pulse width modulated supply voltage. Using a direct current motor driven pump allows for a very easy adjustment of the pump speed by using the pulse width modulated supply voltage and changing the pulse width according to the desired outlet volume flow rate.

Furthermore, it is also possible that the outlet volume flow rate is adjusted by changing a liquid pressure of the liquid in the tap. The liquid pressure may be adjusted by providing a pressure regulating valve, which is in fluid connection with the tap and the liquid reservoir. By controlling the opening and closing of the pressure regulating valve, an amount of liquid provided to the tap can be discharged to the liquid reservoir resulting in a decrease of liquid pressure in the tap and thus in a lower outlet volume flow rate. It is also possible to control the outlet volume flow rate by arranging a valve at or after the pump pressure side and before the tap that can be operated to adjust the outlet volume flow rate.

It is also possible that some or all of the above mentioned control mechanisms are combined and used together to adjust the outlet volume flow rate. Thus, it may for example be advantageous to control the outlet volume flow using a metering valve during the transition of the outlet volume flow rates from low to high and to control the maximum flow rate provided by the pump during the initial conveying period and the following regular or final conveying period by changing the pump speed.

According to an advantageous embodiment of the invention, the initial volume is determined by an initial conveying period during which the initial volume flow rate is conveyed and/or the final volume is determined by a final conveying period during which the final volume flow rate is conveyed. The outlet volume flow rate of the controlled outlet volume flow can be determined from experiments. For example, if the outlet volume flow is controlled by adjusting the pump speed, the relation between pump speed and outlet volume flow rate can be determined from experimental measurements during the development of the conveying device. Thus, during the use of the conveying device the particular outlet volume flow rate is known from the set pump speed and the initial volume and the final volume can easily be determined from the time periods during which the pump is driven at the particular pump speeds corresponding to the initial volume flow rate and the final volume flow rate.

In yet another aspect of the invention at the beginning of a conveying operation the outlet volume flow rate is continuously increased until the initial volume flow rate is reached. In this way it can be avoided that liquid splashes out of the tap outlet of the tap which is pressure less at the beginning of the conveying operation.

According to an advantageous embodiment of the invention, the outlet volume flow rate is continuously increased after reaching the initial volume until the final volume flow rate is reached. This allows for a smooth transition between the flow rates whereby e.g. pressure peaks of the liquid in the tap can be avoided.

In yet another aspect of the invention the liquid is water and the liquid reservoir provides hot or boiling water. The described method is particularly useful for the operation of faucets, if the particular faucet is designed to provide hot or boiling water. However, it is also possible to use this method when providing cold water. Furthermore, it may be advantageous to use the method according to the invention for providing e.g. hazardous liquids in order to avoid spraying such liquids in the surroundings of the conveying device.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

FIG. 1 illustrates a schematic representation of the method according to the invention.

FIG. 1 schematically shows conveying device 1 comprising a liquid reservoir 2, a pump 3 and a tap 4. The liquid reservoir 2, the pump 3 and the tap 4 are fluidly connected. The liquid reservoir 2 is filled with a liquid 5. In this example the liquid reservoir 2 may be a boiler and the liquid hot water.

The pump 3 is a rotary piston pump and driven by a direct current motor. A rotational pump speed of the pump 3 can be changed by varying the supply current or supply voltage of the DC motor, respectively.

The pump 3 conveys liquid 5 from the liquid reservoir 2 via a tap inlet 6 to the tap 4. The liquid 5 emerges from a tap outlet 7 of the tap 4 and flows into a container 8 arranged below the tap outlet 7.

The rotation pump speed of the pump 3 is controlled by a controller 13 with a pulse width modulated supply voltage 9. An outlet volume flow rate 10 (dV/dt) of the liquid 5 flowing from the tap outlet 7 is controlled in such a way that at first the liquid 5 is conveyed with a constant initial volume flow rate 11 (I) until an initial delivery volume has been conveyed and then the liquid 5 is conveyed with a constant final volume flow rate 12 (F). The final volume flow rate 12 is greater than the initial volume flow rate 11.

At the beginning of the conveying operation the outlet volume flow rate 10 is continuously increased until the initial volume flow rate 11 is reached. After reaching the initial volume, the outlet volume flow rate 10 is continuously increased until the final volume flow rate 12 is reached. The outlet volume flow is stopped after reaching a final volume and thus the outlet volume flow rate is zero.

The invention claimed is:

1. A method for conveying a liquid into a container of a conveying device, the conveying device comprising a liquid reservoir, a pump and a tap, wherein the liquid is supplied by the pump from the liquid reservoir via a tap inlet to the tap, and wherein the liquid emerges from a tap outlet of the tap and flows into the container arranged below the tap outlet, wherein an outlet volume flow rate of the liquid flowing from the tap outlet is controlled in such a way that at first the liquid is conveyed with an initial volume flow rate until an initial delivery volume has been conveyed and then the liquid is conveyed with a final volume flow rate, the final volume flow rate being greater than the initial volume flow rate.

2. The method according to claim 1, wherein the outlet volume flow is stopped after reaching a final volume.

3. The method according to claim 1, wherein the outlet volume flow rate is adjusted by changing a flow rate of the pump.

4. The method according to claim 3, wherein the flow rate of the pump is adjusted by changing a pump speed of the pump.

5. The method according to claim 4, wherein the pump is driven by a direct current motor and the pump speed is changed by driving the electric motor with a pulse width modulated supply voltage.

6. The method according to claim 1, wherein the outlet volume flow rate is adjusted by changing a liquid pressure of the liquid in the tap.

7. The method according to claim 1, wherein the initial volume is determined by an initial conveying period during which the initial volume flow rate is conveyed and/or the final volume is determined by a final conveying period during which the final volume flow rate is conveyed.

8. The method according to claim 1, wherein at the beginning of a conveying operation the outlet volume flow rate is continuously increased until the initial volume flow rate is reached.

9. The method according to claim 1, wherein the outlet volume flow rate is continuously increased after reaching the initial volume until the final volume flow rate is reached.

10. The method according to claim 1, wherein the liquid is water and the liquid reservoir provides hot or boiling water.

* * * * *